(12) United States Patent
Choi

(10) Patent No.: US 7,045,078 B2
(45) Date of Patent: May 16, 2006

(54) GREEN OXIDE PHOSPHOR

(75) Inventor: Yoon Young Choi, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/774,500

(22) Filed: Feb. 10, 2004

(65) Prior Publication Data

US 2004/0155226 A1 Aug. 12, 2004

(30) Foreign Application Priority Data

Feb. 10, 2003 (KR) ............... 10-2003-0008157

(51) Int. Cl.
*C09K 11/64* (2006.01)
*C09K 11/55* (2006.01)
(52) U.S. Cl. .................................. 252/301.4 R
(58) Field of Classification Search ............ 252/301
See application file for complete search history.

(56) References Cited

U.S. PATENT DOCUMENTS 5,424,006 A * 6/1995 Murayama et al. ... 252/301.4 R
6,222,312 B1   4/2001 Ghosh et al.

FOREIGN PATENT DOCUMENTS

| EP | 418902 | * 3/1991 |
| JP | 64006086 | 1/1989 |
| JP | 6033052 | 2/1994 |
| JP | 08283712 | 10/1999 |
| WO | WO 02/11214 | 2/2002 |

* cited by examiner

Primary Examiner—C. Melissa Koslow
(74) Attorney, Agent, or Firm—Fleshner & Kim LLP

(57) ABSTRACT

There is provided a green oxide phosphor for emitting a visible ray, having a general composition formula of $Mg_{1-(x+y)}Al_2O_4:Eu_x^{2+}, M_y^{2+}$. In the green oxide phosphor, $Eu^{+2}$ is doped into a crystal of $Mg_{1-(x+y)}Al_2O_4$ as an activator; and $Mn^{+2}$ is added as a co-dopant.

5 Claims, 5 Drawing Sheets

R: $(YGd)BO_3:Eu^{3+}$
Phosphor

G: $Zn_2SiO_4:Mn^{2+}$
Phosphor

B: $BaMgAl_{10}O_{17}:Eu^{2+}$
Phosphor

R: $(YGd)BO_3:Eu^{3+}$ Phosphor

G: $Mg_{1-(x+y)}Al_2O_4:Eu_x^{2+},M_y^{2+}$ Phosphor

B: $BaMgAl_{10}O_{17}:Eu^{2+}$ Phosphor

GREEN OXIDE PHOSPHOR

BACKGROUND OF THE INVENTION

1. Field of the Invention

The present invention relates to a phosphor, and more particularly, to a green oxide phosphor that has improved chemical stability as well as improved luminance.

2. Description of the Related Art

Generally, phosphor indicates a material emitting visible ray when the phosphor excited by an electromagnetic wave such as an ultraviolet ray, an electron ray or an X-ray, transits to a ground state back. Various phosphors have been developed. These phosphors have metal oxide, sulfide, acid sulfide, halide, or the like as a host lattice and emit near ultraviolet ray or visible ray due to the above-mentioned electromagnetic wave.

The phosphors are widely used in a fluorescent lamp, a radioactive ray intensifying screen, an indoor/outdoor decoration fluorescent tile, and a display device, such as a cathode ray tube (CRT), a vacuum fluorescent display (VFD) or a plasma display panel (PDP).

Particularly, in the PDP, a vacuum ultraviolet ray of 147 nm allows the phosphor to emit light so that an image is displayed. The vacuum ultraviolet ray is generated when inert mixed gases, such as He+Xe, Ne+Xe and He+Xe+Ne are discharged. Since the PDP can be easily made in a slim and large-sized structure, it attracts attention as a large-sized flat panel display.

Recently, the PDP begins to be produced commercially in Korea and Japan, and extends its market share, and the image quality of the PDP continues to be improved thanks to the advancing of its technology.

Referring to FIG. 1, a discharge cell of a three-electrode AC surface discharge type PDP includes a pair of sustain electrodes 9 formed on an upper substrate 1 and an address electrode X formed on a lower substrate 2.

Each of the pair of sustain electrodes 9 includes a transparent electrode 9a of Indium-Tin-Oxide (ITO) and a metal bus electrode 9b formed on an edge of the transparent electrode 9a and having a narrower width than the transparent electrode 9a. The metal bus electrode 9b is formed by sequentially depositing Cr/Cu/Cr and etching the deposited Cr/Cu/Cr. An upper dielectric layer 6 and a passivation layer 7 are deposited on the upper substrate 1 on which the pair of sustain electrodes 9 are formed, by using a screen printing process or a vacuum deposition process. Wall charges generated during plasma discharge are accumulated on the upper dielectric layer 6. The passivation layer 7 is formed on the upper dielectric layer 6 at a thickness of about 5000 Å so as to protect the upper dielectric layer 6 and the pair of sustain electrodes 9 from damages caused by sputtering during plasma discharge and to enhance a discharge efficiency of secondary electrons. In general, magnesium oxide (MgO) is used for the passivation layer 7.

In drawings, Y represents a scan sustain electrode and Z represents a common sustain electrode.

A lower dielectric layer 4 and a barrier rib 3 are formed on a lower substrate on which an address electrode X is formed. A phosphor 5 is formed on the surfaces of the lower dielectric layer 4 and the barrier rib 3 by a screen printing process. The address electrode X is perpendicular to the sustain electrode pair 9.

The barrier rib 3 is formed by a screen printing or a molding process to prevent ultraviolet rays and visible rays generated during discharge from leaking to an adjacent discharge cell. The phosphor 5 is excited by a vacuum ultraviolet ray to emit one visible ray of any one of red, green and blue. The vacuum ultraviolet ray is generated during plasma discharge of the mixed gases injected into the discharge cell.

In order to realize the gray scale of an image, the PDP is time-division driven by dividing one frame into several sub-fields having different emission frequencies. Each sub-field is divided into an initialization period, an address period and an sustain period. In the initialization period, a full screen is initialized. In the address period, a scan line is selected and a cell is selected in the selected scan line. In the sustain period, the gray scale is realized according to discharge rate.

For example, when an image is displayed in 256 gray scales, a frame period (16.67 ms) corresponding to $\frac{1}{60}$ second is divided into eight sub-fields SF1 to SF8 as shown in FIG. 2. Each of the eight sub-fields SF1 to SF8 is divided into the initialization period, the address period and the sustain period as described above. The initialization period and the address period are the same in each sub-field while the sustain period increases at a rate of $2^n$ (n=0, 1, 2, 3, 4, 5, 6, 7).

In the PDP operating as described above, the phosphor 5 is excited by the vacuum ultraviolet ray to emit light, and is classified into a red phosphor, a green phosphor and a blue phosphor according to the wavelength of the emitted light.

Referring to FIG. 3, the red phosphor widely used in the PDP has a composition of $(Ygd) BO_3:Eu^{3+}$, the blue phosphor has a composition of $BaMgAl_{10}O_{17}:Eu^{2+}$, and the green phosphor has a composition of $Zn_2SiO_4:Mn_{2+}$. Such phosphors are coated on the barrier rib 3 of the PDP and directly exposed to mixed gases filled in a discharge cell 10. Negative and positive charges 11 and 12 are present in the discharge cell 10. If the mixed gases emit vacuum ultraviolet ray during plasma discharge, each of the phosphors emits red, green and blue lights.

Then, since the green phosphor with the composition of $Zn_2SiO_4:Mn^{2+}$ is long in afterglow time during which green light continues to be maintained after the green light is emitted, an afterimage is left on the PDP screen. Consequently, the conventional green phosphor deteriorates the display quality of the PDP. In addition, since the dielectric characteristic and the surface characteristic of the conventional green phosphor are not excellent, the conventional green phosphor has a discharge delay problem that discharge is not generated in time. Since the conventional green phosphor has a high threshold voltage to emit the light, that is, a high discharge voltage, its power consumption is increased. Hence, it is an urgent subject to develop the phosphor with a short afterglow time, excellent dielectric characteristic and excellent surface characteristic so as to improve the display quality of the PDP and to reduce the consumption power.

Furthermore, since the application of the phosphor as well as the application of the PDP is diversified and highly developed today, it is strongly required to develop a green phosphor that can solve the above-mentioned problems, and that has a higher luminance characteristic than the conventional phosphor, and is chemically stable under various application environments.

SUMMARY OF THE INVENTION

Accordingly, the present invention is directed to a green oxide phosphor that substantially obviates one or more problems due to limitations and disadvantages of the related art.

It is an object of the present invention to provide a green oxide phosphor that has an improved chemical stability as well as an improved luminance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a green oxide phosphor for emitting a visible ray has a general composition formula of $Mg_{1-(x+y)}Al_2O_4:Eu_x^{2+}, M_y^{2+}$.

$Eu^{+2}$ is doped into a crystal of $Mg_{1-(x+y)}Al_2O_4$ as an activator; and $Mn^{+2}$ is added as a co-dopant.

M is at least one selected from the group consisting of alkaline earth metals and transition metals such as Ca, Ba, Sr, Cu and Zn having a valence of +2.

X and Y are numbers ranged from 0 to 0.9999 respectively.

The sum of X and Y is in the range from 0 to 0.9999.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying FIGS. 4 and 5. Wherever possible, the same reference numbers will be used throughout the drawings to refer to the same or like parts.

Figure 1:
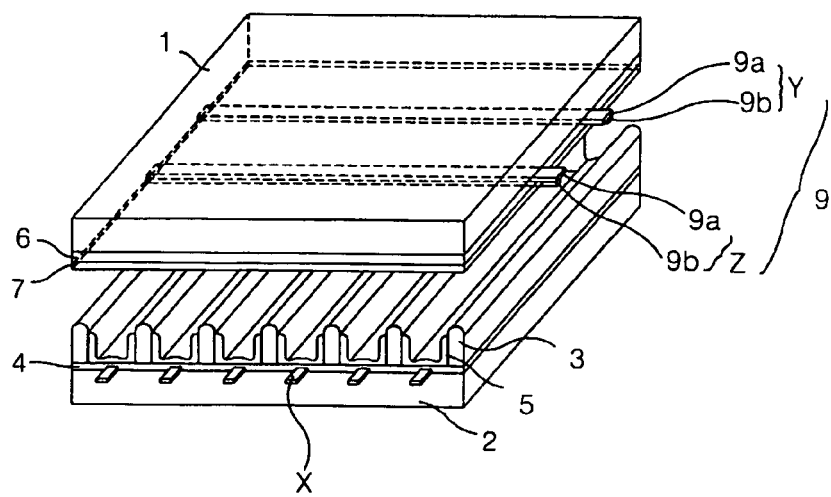
FIG. 1 is a perspective view of a structure of a discharge cell of the conventional three-electrode AC surface discharge type plasma display panel.
Figure 2:
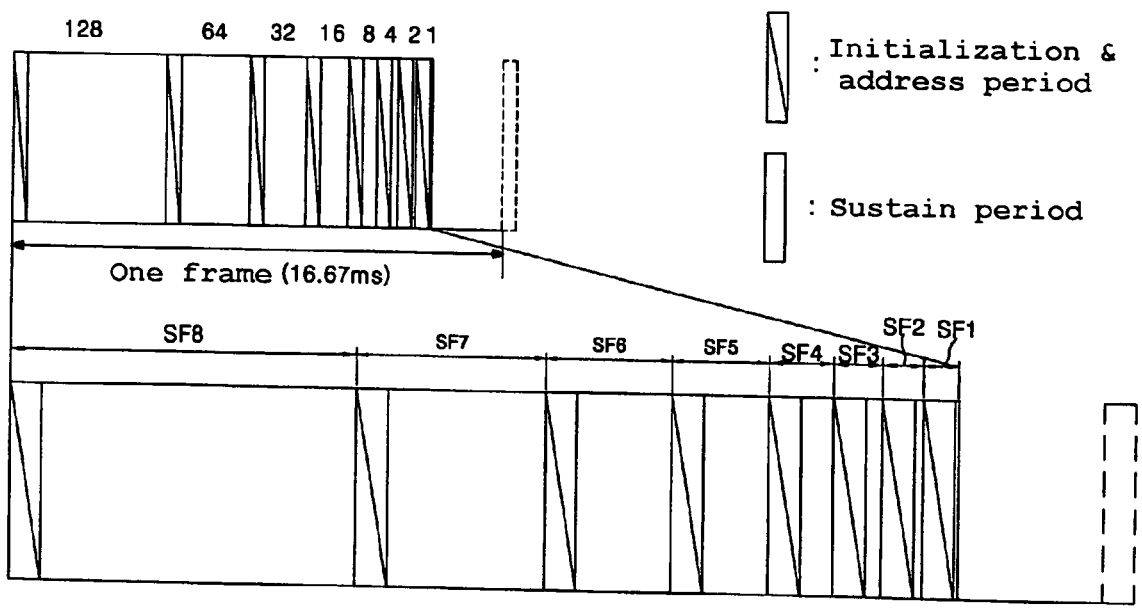
FIG. 2 illustrates a frame for representing 256 gray scales of a general plasma display panel.
Figure 3:
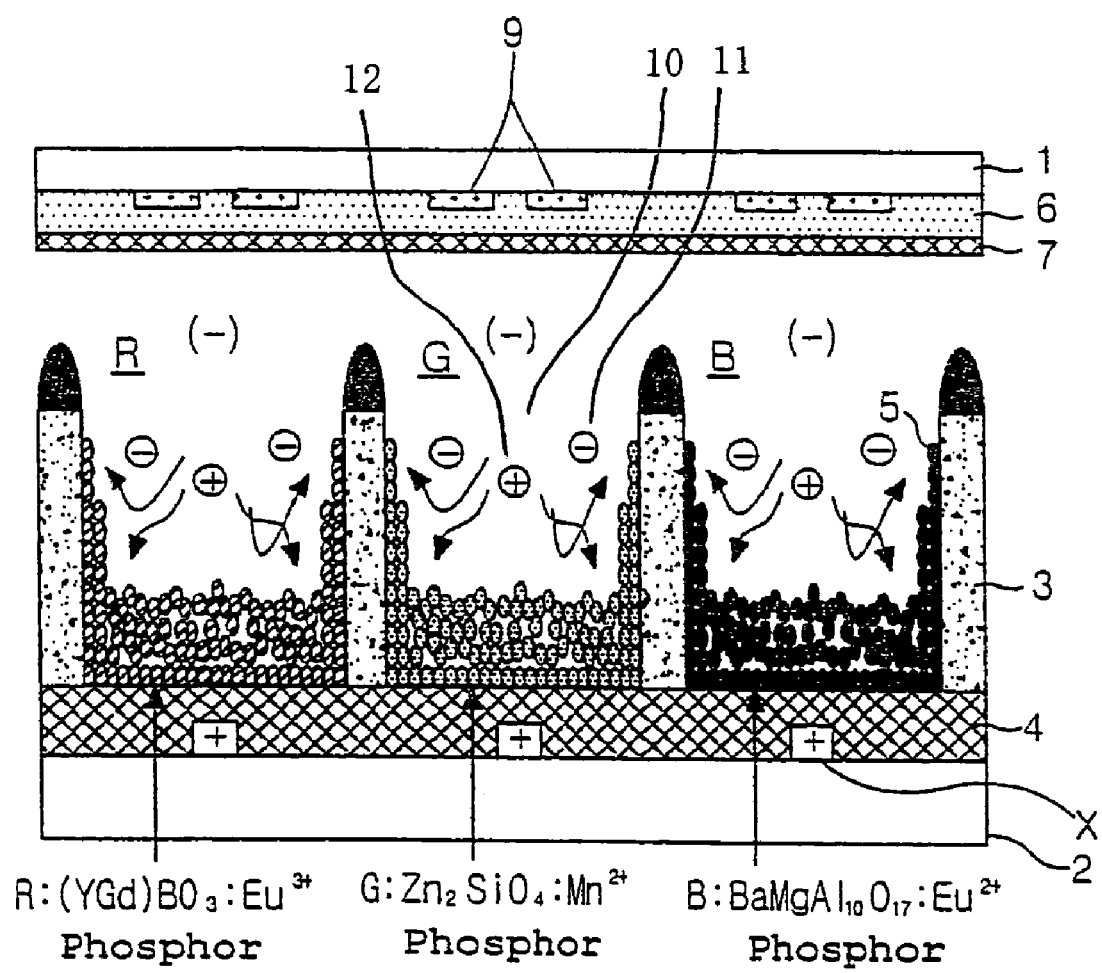
FIG. 3 is a cross-sectional view of a phosphor coated on a discharge cell of the conventional plasma display panel.
Figure 4:
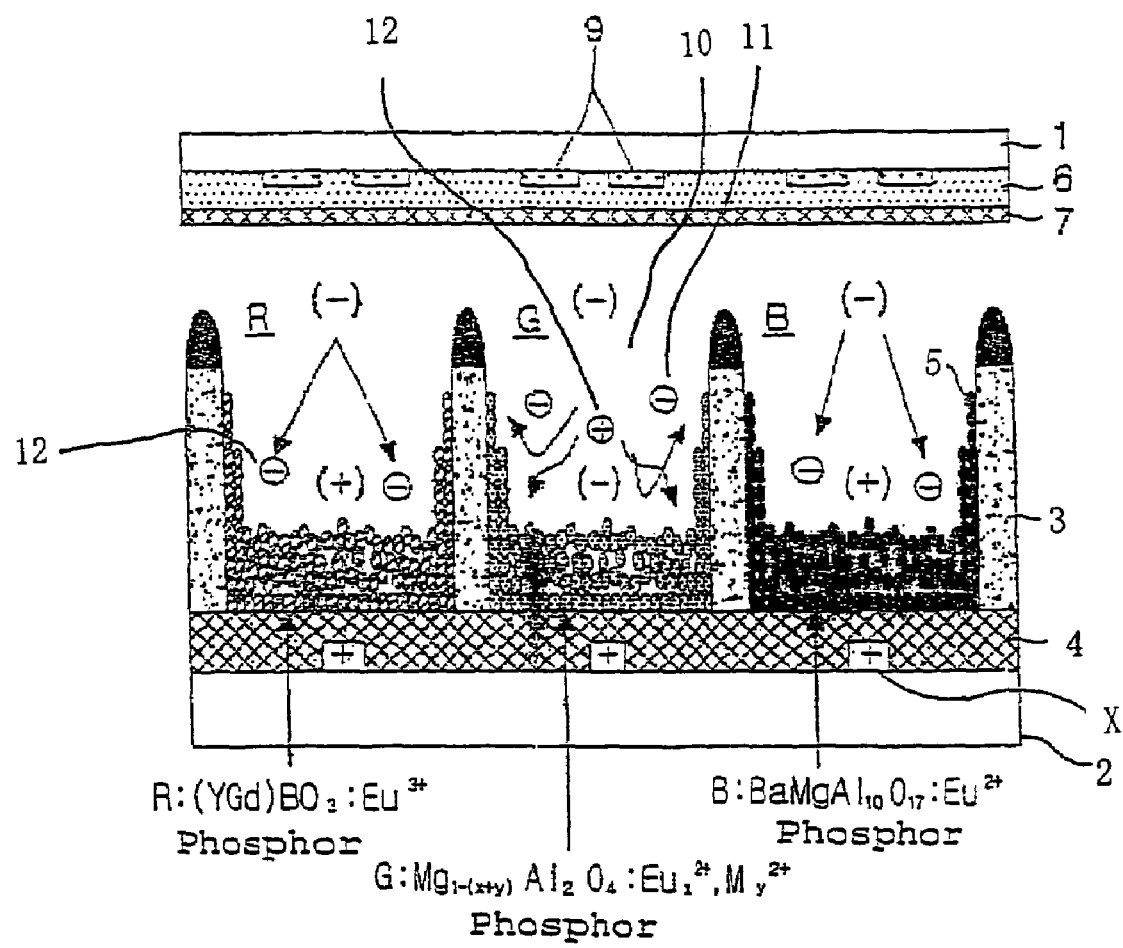
FIG. 4 is a cross-sectional view of a plasma display panel coated with a green oxide phosphor according to an embodiment of the present invention.
Figure 5:
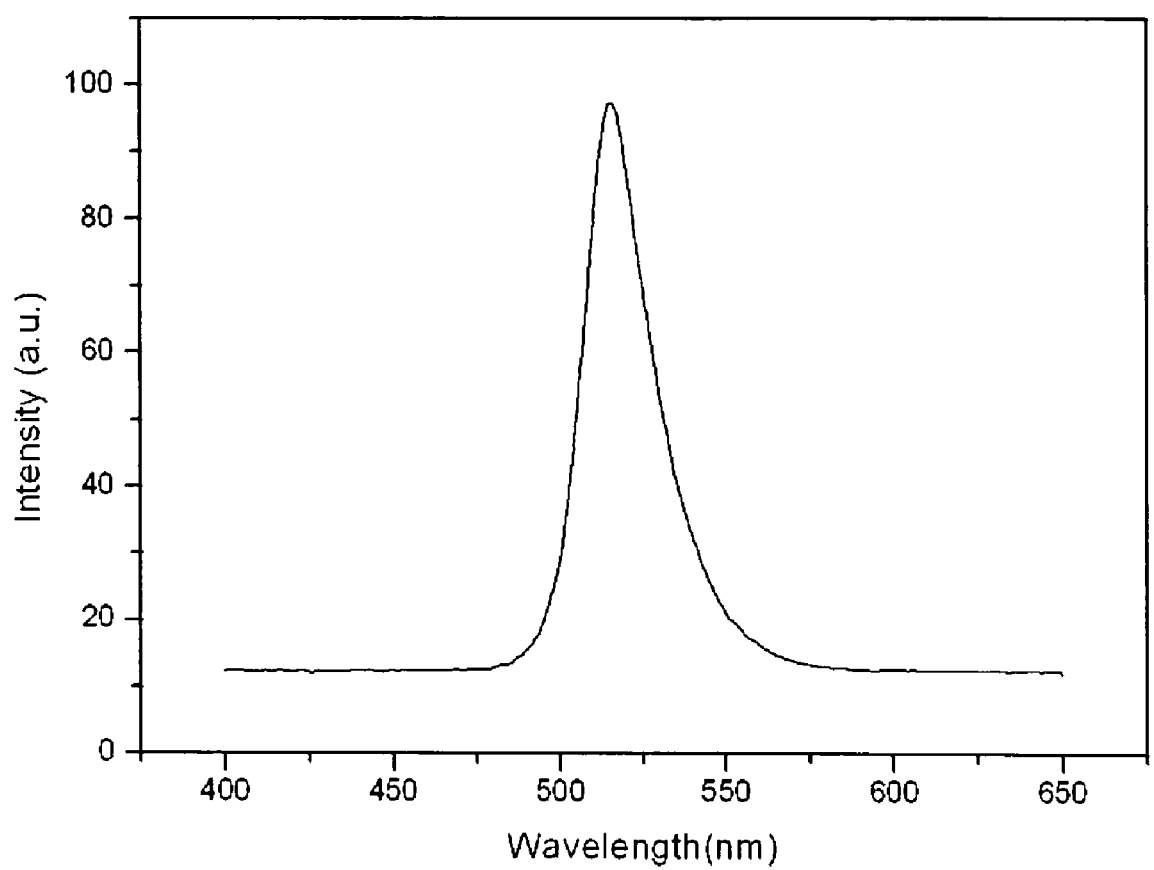
FIG. 5 illustrates a light emission spectrum of a green oxide phosphor according to an embodiment of the present invention.

Referring to FIG. 4, a green oxide phosphor according to an embodiment of the present invention has a general composition formula of $Mg_{1-(x+y)}Al_2O_4:Eu_x^{2+}, M_y^{2+}$, and has chemical and thermal stabilities, good color purity and short afterglow time.

Here, Eu represents europium doped as $Eu^{+2}$ and acting as an activator. M represents at least one element selected from the group consisting of alkaline earth metals and transition metals such as Mn, Ca, Ba, Sr, Cu and Zn each having a valence of +2, and is added as a co-dopant along with Eu. X and Y represent the numbers ranged from 0 to 0.9999 respectively and the sum of X and Y is in the range from 0 to 0.9999.

The green oxide phosphor of such a composition has the excellent chemical and thermal stabilities and the afterglow time of a few micrometers. The emitted light has a main peak located at 515 nm and a narrow peak width at half height as shown in FIG. 5 so that the green color purity of the emitted light is high. Furthermore, this green oxide phosphor has a property of positive surface charge due to $Eu^{2+}$ and also has high permittivity.

The method for fabricating the green oxide phosphor will be described in brief.

First, compounds are prepared, which include the compounds according to the general composition formula of $Mg_{1-(x+y)}Al_2O_4:Eu_x^{2+}, M_y^{2+}$ that is the green oxide phosphor.

The compound including Mg is oxide of magnesium or one of magnesium compounds such as carbonate, nitrate, sulfate and halide, which can be easily changed into magnesium oxide at high temperature.

The compound including aluminum (Al) is oxide of aluminum or one of aluminum compounds such as carbonate, nitrate, sulfate and halide, which can be easily changed into aluminum oxide at high temperature.

The compound including Eu is oxide of europium or one of europium compounds such as carbonate, nitrate, sulfate and halide, which can be easily changed into europium oxide at high temperature.

The compound including M is oxide of M element or one of M compounds such as carbonate, nitrate, sulfate and halide, which can be easily changed into M oxide at high temperature. Here, M is any one of alkaline earth metals and transition metals such as Mn, Ca, Ba, Sr, Cu and Zn each having a valence of +2.

Here, X and Y are arbitrary numbers ranged from 0 to 0.9999 respectively. The sum of X and Y is in the range from 0 to 0.9999.

When the compounds including each element according to the general composition formula of the green oxide phosphor are prepared, amounts of the respective compounds are measured according to amount ratio of the general composition formula. Liquid solvent is added to the compounds and the compounds are fully mixed using a mixer such as a ball mill. After the mixed compounds are dried, a mixture of raw materials of the phosphor is obtained. Here, a low melting point compound of 1 wt % to 10 wt % in melted state, such as boron compound, ammonium salt and halide of alkaline metal or a alkaline earth metal can be added and mixed with the compounds so as to promote crystal growth of the mixture of the raw materials of the phosphor and to improve luminescence.

When the mixture of the raw materials of the phosphor is made, it is placed in a heat-resistant vessel such as an alumina crucible and sintered in reduction atmosphere. At this time, if inert gas containing hydrogen of 1 to 30% is injected into the heat-resisting vessel and the mixture is sintered, the activator Eu can be maintained as $Eu^{2+}$. Then, $Eu^{2+}$ can be easily doped into the host lattice. $Eu^{2+}$ doped into the host lattice improves the luminance of the emitted green light of the phosphor. Here, the mixture of the raw materials of the phosphor is pressedly formed into pellet type before sintered. After sintered, the mixture of the raw materials of the phosphor is crushed to form the phosphor. The temperature for sintering the mixture of the raw materials of the phosphor is about 800–1700° C. The sintering is performed for 2–5 hours. The sintering temperature and time are dependent on the supply amount of the raw materials. The sintering can be performed once. However, in the view point of the luminescence of the phosphor, it is desirable that the sintering, cooling and crushing processes are repeatedly performed several times with sequentially increasing the sintering temperature after the sintering is performed once.

After the sintered mixture of the raw materials of the phosphor is cooled, it is crushed, cleaned, dried and sieved to be made in the form of powder. The powder is the green oxide phosphor according to the present invention.

The green oxide phosphor has excellent chemical and thermal stabilities and an afterglow time of a few microseconds. In addition, the emitted light has a main peak located at 515 nm and a narrow peak width at half height as shown in FIG. 5 so that the green color purity of the emitted light is high.

Figure 6:
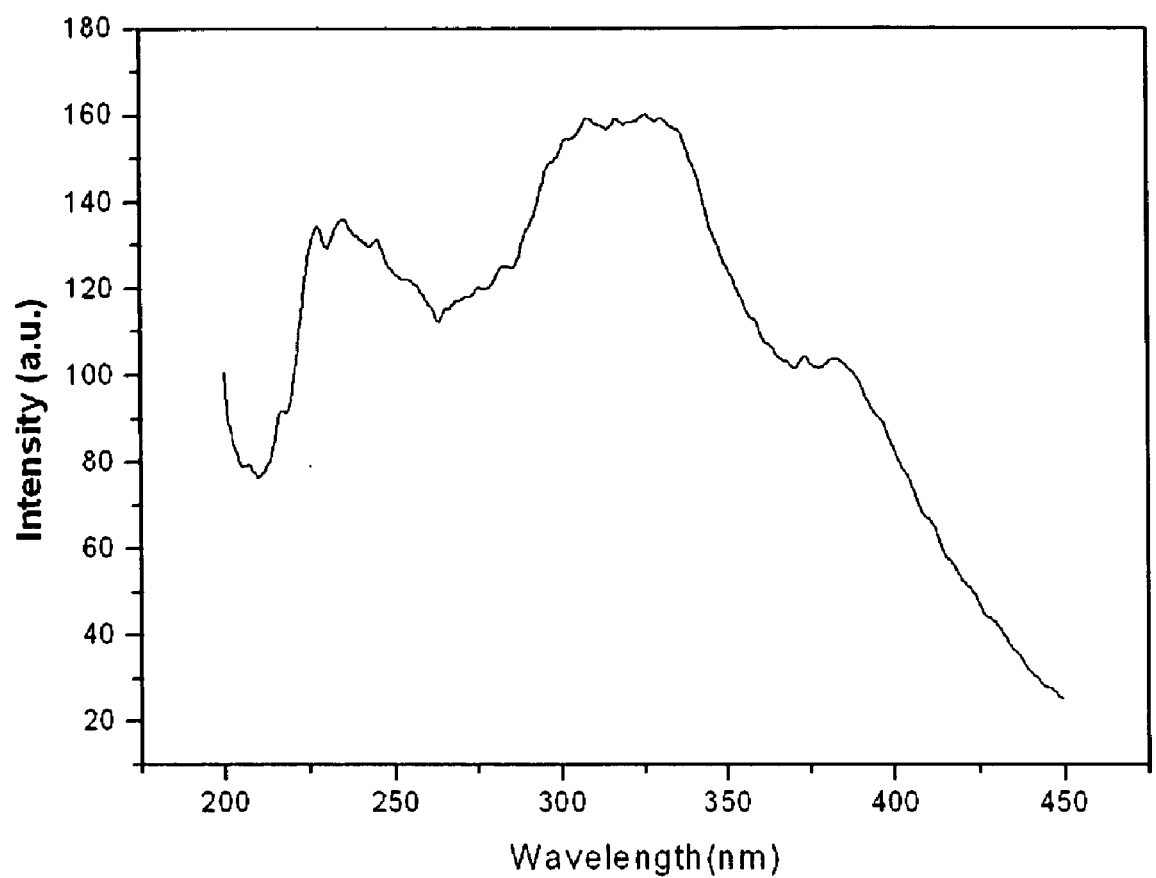
FIG. 6 illustrates an excitation spectrum of a green oxide phosphor according to an embodiment of the present invention.

Furthermore, this green oxide phosphor has a property of positive surface charge due to the doped $Eu^{2+}$ and also has high permittivity. Referring to FIG. 6 illustrating an excitation spectrum of a green oxide phosphor according to an embodiment of the present invention, the green oxide phosphor has a strong absorption peak at 254 nm that is in an ultraviolet range. Accordingly, the green oxide phosphor according to an embodiment of the present invention can be applied to various applications. For example, if the green oxide phosphor of the present invention is employed in a lamp that uses an ultraviolet light source of 254 nm, the consumption power can be reduced and the efficiency and the luminescence characteristic can be improved. If the green oxide phosphor of the present invention is employed as a green phosphor in a PDP that uses $N_2$ gas, the luminescence of the green light emitted from the green oxide phosphor excited by the ultraviolet light is improved so that the efficiency and the luminescence characteristic of the PDP are improved.

The green oxide phosphor according to the present invention and the method for fabricating the green oxide phosphor will be described with experiment data as an example.

First, the compounds are prepared, which include respective components according to the general composition formula of $Mg_{1-(x+y)}Al_2O_4:Eu_x^{2+}, M_y^{2+}$ that is the green oxide phosphor. The compound including Mg is MgO and added as much as 3.2244 g. The compound including Al is $Al_2O_3$ and added as much as 10.1961 g. The compound including Eu is $Eu_2O_3$ and added as much as 3.5193 g. The compound corresponding to M is MnO and added as much as 0.7094 g.

When the compounds of raw materials of the phosphor are prepared, liquid solvent is added to the compounds and the compounds are mixed in a stirrer type mixer and dried. The dried mixture is placed in an alumina vessel and sintered therein. The sintering is performed for 6 hours at the temperature of 1400° C. in the reduction atmosphere in which $N_2$ containing $H_2$ of 5% is injected.

Then, the fabricated green oxide phosphor has a composition of $Mg_{0.8}Al_2O_4:Eu_{0.1}Mn_{0.1}$. It was observed that the green oxide phosphor of composition of $Mg_{0.8}Al_2O_4:Eu_{0.1}Mn_{0.1}$ was excited by an ultraviolet ray of 254 nm to emit a green light. The fabricated green oxide phosphor was analyzed using an X-ray diffractometer so that a crystal phase of $MgAl_2O_4$ was confirmed.

As described above, the green oxide phosphor according to the present invention has the general composition formula of $Mg_{1-(x+y)}Al_2O_4:Eu_x^{2+}, M_y^{2+}$, the excellent chemical and thermal stabilities and the afterglow time of a few micrometers. Consequently, the green oxide phosphor according to the present invention can suppress green afterimage when applied to a PDP.

In addition, the emitted light according to the present invention has a main peak located at 515 nm so that the green color purity is high and luminescence characteristic is excellent.

Furthermore, the green oxide phosphor according to the present invention has a strong absorption peak in the range from 250 nm to 400 nm that belongs to the ultraviolet range. Accordingly, when applied to a PDP, the efficiency and luminescence characteristics of the PDP are improved.

Additionally, the green oxide phosphor according to the present invention has a high permittivity corresponding to excellent charge property. Accordingly, when the green oxide phosphor is applied to the PDP, discharge stability is excellent and discharge voltage is reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A green oxide phosphor used for emitting a visible ray, has a general composition formula of $Mg_{1-(x+y)}Al_2O_4:Eu_x^{2+}, M_y^{2+}$, wherein X and Y are number range from 0 to 0.9999 respectively, and a sum of X and Y is in the range from more than 0 to 0.9999, wherein $Eu^{+2}$ is doped into a crystal of $Mg_{1-(x+y)}Al_2O_4$ as an activator; and
$Mn^{+2}$ is added as a co-dopant.

2. The green oxide phosphor according to claim 1, wherein M of $M_y^{2+}$ is at least one selected from the group consisting of alkaline earth metals and transition metals.

3. The green oxide phosphor according to claim 2, wherein the alkaline earth metals and transitional metals are Ca, Ba, Sr, Cu and Zn.

4. The green oxide phosphor according to claim 1, wherein the wavelength of light emitted is about 515 nm.

5. The green oxide phosphor according to claim 1, having an absorption peak wavelength of light at about 254 nm.

* * * * *